UNITED STATES PATENT OFFICE.

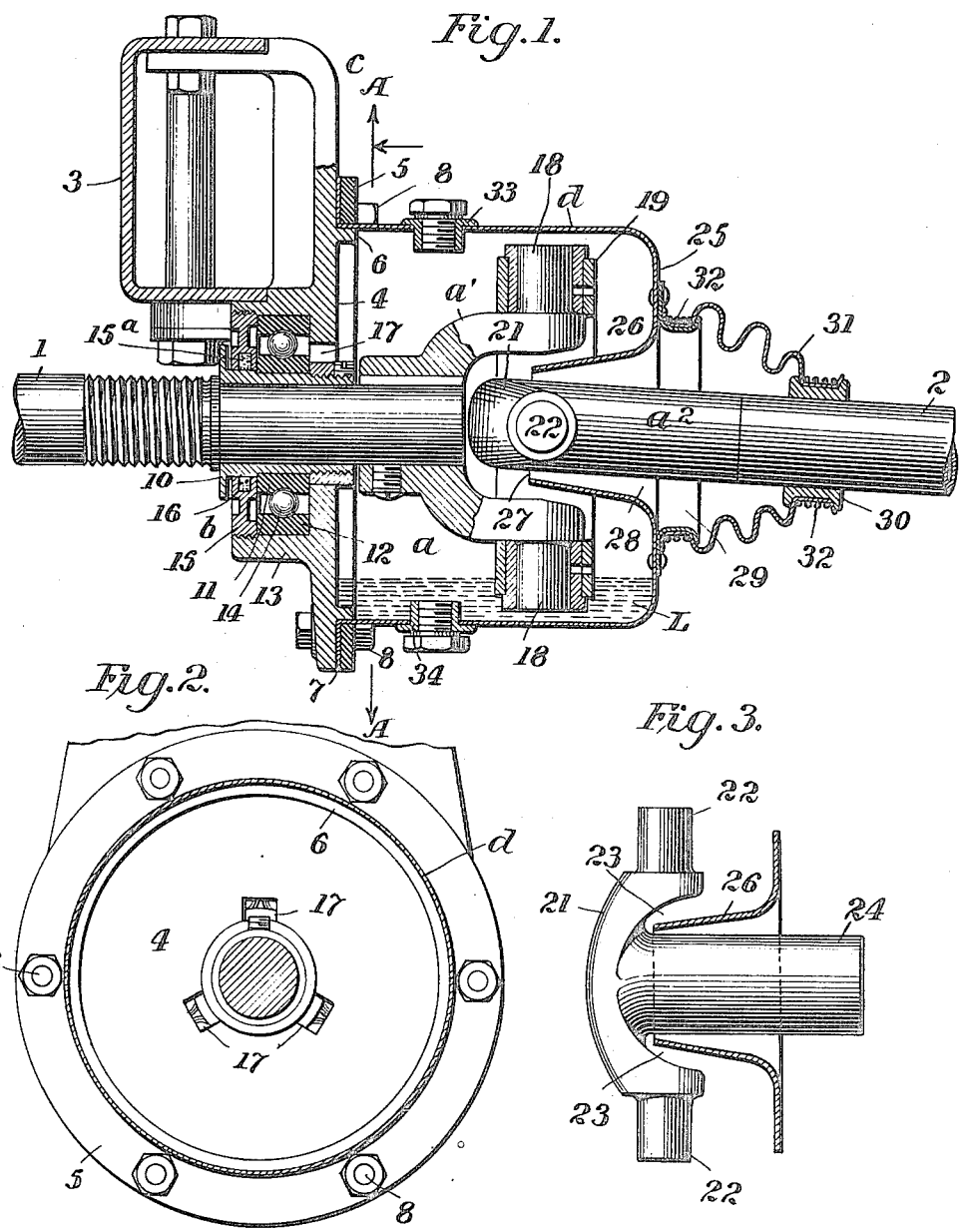

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRANSMISSION-SHAFT FOR MOTOR-VEHICLES.

1,167,695.               Specification of Letters Patent.          Patented Jan. 11, 1916.

Application filed August 24, 1907. Serial No. 390,021.

*To all whom it may concern:*

Be it known that I, RUSSELL HUFF, a citizen of the United States, residing at Detroit, Wayne county, Michigan, have invented certain new and useful Improvements in Transmission-Shafts for Motor-Vehicles, of which the following is a specification.

This invention relates primarily to transmission shafts for motor vehicles, and it consists in various improvements in the universal joints for said shafts and bearings, casings and lubricating devices therefor.

Certain features of the invention are applicable to universal joints and transmission shafts generally, while others are particularly useful in motor vehicles, and it is to be understood that the invention is claimed for any uses for which it may be applicable.

The invention will be described in connection with the accompanying drawing in which—

Figure 1 is a sectional view of a portion of a transmission shaft, universal joint and related parts; Fig. 2 is a section on the line A A of Fig. 1; and Fig. 3 is a side view of one of the coupling members, and also a sectional view through the conical flange of the casing.

Referring to the drawing, 1 and 2 indicate two members or sections of a transmission shaft which are connected by a universal joint $a$. When used upon an automobile, for which the invention is primarily intended, the shaft section 1 is the driving section, connected to the clutch mechanism and the section 2 is the driven section, which is connected to the differential gear mechanism. The driving section 1 is supported, adjacent to the universal joint, in a bearing $b$ arranged upon one side of a bracket or hanger $c$ which latter is suspended from a cross bar 3 of the vehicle frame, as shown in Fig. 1. The bracket has on one side a flat face 4 against which one end of a cylindrical sheet metal casing $d$ is secured by means of a clamping ring 5 which surrounds an annular flange 6 on said face and grips the end portion 7 of the sheet metal casing, as shown in Fig. 1. The clamping ring is suitably held in place by bolts 8. The shaft section 1 extends through an opening in the hanger, and a sleeve 10, fixed to the shaft, carries a ball race-way 11 which is opposed to a race-way 12 arranged within a hub 13, the latter being integral with the bracket $c$ and arranged at the opposite side thereof from the sheet metal casing $d$. Balls 14 are arranged between the race-ways, and a retaining ring 15 is threaded into the outer end of the hub as shown. A suitable packing $15^a$ is arranged within an annular recess 16 in the inner edge of the retaining ring and this packing bears against the sleeve 10 so as to exclude dust from the bearing and to prevent the escape of oil. One or more openings 17 extend through the bracket adjacent to the shaft, for the purpose of permitting oil to pass from the interior of the sheet metal casing $d$, through the bracket to the space between the race-ways 11 and 12 of the bearing.

The universal joint $a$ comprises a forked member $a'$, which is keyed to the shaft section 1 and has trunnions 18 projecting into bearings in a ring 19, and a member $a^2$ having a head 21 provided with trunnions 22 which fit into bearings arranged in the ring 19 at right angles to the trunnions 18. The joint is of usual construction except that in the member $a^2$ recesses 23 are provided between the shank and the head in line with the trunnions 22, for a purpose hereinafter described. In the drawing the shank 24 joins the head at some distance beyond the axial line of the trunnions.

The cylindrical sheet metal casing $d$, which, as before explained, is secured to the face of the hanger or bracket $c$ by means of the clamping ring 5, projects outwardly far enough from said bracket to completely surround the universal joint, and it has a head 25 provided with a central opening through which the shank 24 of the coupling, which forms a continuation of the shaft member 2, extends. As shown in the drawing the central portion of the head is turned inwardly, forming a conical flange 26 which surrounds the shank 24 of the coupling and extends into the recesses 23 between the shank and the head 21. The inner end of this flange preferably extends to or slightly beyond the axial line of the trunnions, where its open end can be brought close to that part of the shank 24 which has the least rocking movement. As the internal flange 26 tapers inwardly from the head 25 to its open end 27, a flaring opening 28 is thus provided within which the shank 24 of the coupling is free to move in adjusting itself with relation to the shaft member 1. The casing also has an external or outwardly projecting annular flange 29, which is suitably secured to the head 25 and concentric with the internal flange or cone 26. Upon the shaft member 2 is arranged a collar 30 which fits the shaft closely, but is free to slide lengthwise thereon and the shaft may turn freely within the collar. A flexible shield or covering 31, made of leather or other suitable fabric is secured to the flange 29 and to the collar 30 by suitable means such as the wires 32, this shield inclosing the space between the casing and the collar so as to exclude dust and retain the lubricant.

The casing is provided with a suitable inlet 33 for the admission of oil and with a suitable drainage outlet 34, the inlet and outlet being provided with suitable caps or closures.

In operation, a suitable quantity of lubricant L is placed within the casing, and the coupling ring and trunnions dip into the oil. The rotation of the shaft causes the coupling to spatter the oil about within the casing and in this way a sufficient quantity of oil is passed through the openings 17, to keep the bearing $b$ constantly lubricated. As the open end of the internal flange 26 is at the central portion of the coupling and close to the shank 24, while the oil, owing to centrifugal force, is constantly thrown away from the center by the coupling, it will be seen that very little of the oil will pass through the opening 27. As the casing is stationary, it is necessary to journal the collar 30 on the shaft. This collar and the shield 31 prevent dust from entering the casing, at one end, and also prevent the escape of oil, and the retaining ring, 15, prevents dust from passing through the bearing $b$ and into the casing, and it also prevents the escape of oil.

What I claim is:

1. The combination with two shaft members and a universal joint connecting said members, of a stationary casing surrounding said joint and having an open end for one of said shaft members to extend through, a collar closely journaled upon said latter shaft member, and a flexible shield extending between the open end of said casing and said collar.

2. The combination with two shaft members and a universal joint connecting said members, of a stationary casing surrounding said joint and having an open end for one of said shaft members to extend through, said casing having an outwardly projecting annular flange at its open end, a collar closely journaled on said latter shaft member, and a flexible shield secured to said annular flange and to said collar.

3. The combination with two shaft members and a universal joint connecting said members, of a casing surrounding said joint and having an open end for one of said shaft members to extend through, said casing having an annular flange projecting inwardly from said end toward the central portion of said joint.

4. The combination with two shaft members and a universal joint connecting said members, of a casing surrounding said joint and having an open end for one of said shaft members to extend through, said casing having a conical flange projecting inwardly from said end toward the central portion of said joint.

5. The combination with a universal joint comprising a forked member having trunnions, a member having a head provided with trunnions said latter member having recesses between its trunnions and its shank, and means connecting the trunnions of said members, of a stationary casing surrounding said coupling and having an open end and having an annular flange extending from said open end into said recesses.

6. The combination with a universal joint comprising a forked member having trunnions, a member having a head provided with trunnions, said latter member having recesses between its trunnions and its shank, and means connecting the trunnions of said members, of a stationary casing surrounding said coupling and having an open end and having an inwardly tapering annular flange extending from said open end into said recesses.

7. The combination with two shaft members and a universal joint coupling connecting said members, of a bracket having a bearing for one of said members, said bearing being closed at one side of the bracket and open at the side next to the coupling, and a casing having one end secured to the bracket and surrounding the coupling and having a head at its opposite end provided with an opening for the other of said shaft members to extend through.

8. The combination with two shaft members and a universal joint connecting said members, of a flat, stationary bracket having an opening for one of said members to extend through and having a bearing for said latter member, said bearing being closed at one end and said bracket having one or more openings for admission of oil to the other end of the bearing, a cylindrical casing having one end secured to the face of the bracket and having a head provided with an opening through which the other of said shaft members extends, and a flexible shield connected to said casing and extending around said last mentioned member.

9. The combination of a supporting bracket having a bearing therein, a transmission shaft comprising two members and a universal joint connecting said members, one of said members being journaled in said bearing, a sheet metal casing secured to said bracket and extending around the coupling, said casing having an opening through which one of said members extends, a collar journaled on said latter member, and a flexible shield secured to said casing and to said collar.

10. The combination with a frame and a bracket supported on said frame, of a bearing in said bracket, a shaft member rotating in the bearing, a second shaft member, a universal joint connecting said shaft members, a fixed casing supported by said bracket and surrounding the universal joint, said casing having an opening through which one of said shaft members extends, and a flexible shield arranged to close the opening between the shaft member and the casing.

11. The combination with a fixed support, of a shaft member having a bearing in said support, a second shaft member, a universal joint connecting said shaft members, and a fixed casing surrounding said joint, the said casing having an inturned annular flange extending substantially to a plane passing through the center of said joint.

12. The combination with a fixed support, of a shaft member having a bearing in said support, a second shaft member, a universal joint connecting said shaft members, and a fixed casing surrounding said joint, the said casing having a tapered inturned flange extending substantially to a plane passing through the center of said joint.

13. The combination with a support, of a shaft having a bearing therein, a second shaft, a universal joint connecting said shafts, a casing inclosing said joint and secured to said support, said casing having an opening opposite said bearing through which said second shaft passes out of contact with the casing, a collar journaled upon said second shaft, and a flexible shield secured to said casing and to said collar.

In testimony whereof I affix my signature in presence of two witnesses.

RUSSELL HUFF.

Witnesses:
  MILTON TIBBETTS,
  CLARA I. DALE.